United States Patent [19]

Taniguchi

[11] Patent Number: 5,802,472
[45] Date of Patent: Sep. 1, 1998

[54] RECONNECTION APPARATUS IN DIRECT COMMUNICATION SYSTEM BETWEEN SUBSIDIARY RADIOTELEPHONE UNITS

[75] Inventor: Keiichi Taniguchi, Tokyo, Japan

[73] Assignee: NEC Corporation, Tokyo, Japan

[21] Appl. No.: 707,614

[22] Filed: Sep. 5, 1996

[30] Foreign Application Priority Data

Sep. 6, 1995 [JP] Japan .................. 7-228450

[51] Int. Cl.[6] .................. H04B 1/38; H04B 7/005
[52] U.S. Cl. .................. 455/445; 455/38.3; 455/514; 370/311; 370/347; 370/510; 375/219; 375/356; 375/358
[58] Field of Search .................. 455/38.3, 31.1, 455/73, 514, 70, 445; 370/311, 347, 498, 510; 375/219, 356, 358

[56] References Cited

U.S. PATENT DOCUMENTS

| 4,568,800 | 2/1986 | Orikasa .................. 455/463 |
| 5,159,702 | 10/1992 | Aratake .................. 455/33.1 |
| 5,636,243 | 6/1997 | Tanaka .................. 455/38.3 |

FOREIGN PATENT DOCUMENTS 7-107560  4/1995  Japan .
8-172375  7/1996  Japan .

Primary Examiner—Willis R. Wolfe
Attorney, Agent, or Firm—Young & Thompson

[57] ABSTRACT

A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, comprises detection means for detecting the passage of the prescribed duration of a continuous connection and informing the expiration of the prescribed duration of a continuous connection immediately before the prescribed duration of a continuous connection expires; judging means for judging whether there is a communication continuation instruction from the outside in response to the information from the detection means; storing means for storing at least information on the connection destination of the direct communication and information on connection between the subsidiary radiotelephone units when the judging means judges that there is the communication continuation instruction; and means for carrying out reconnection with the connection destination of the direct communication based on the connection destination information and the connection information of the storing means when the judging means judges that there is the communication continuation instruction.

14 Claims, 9 Drawing Sheets

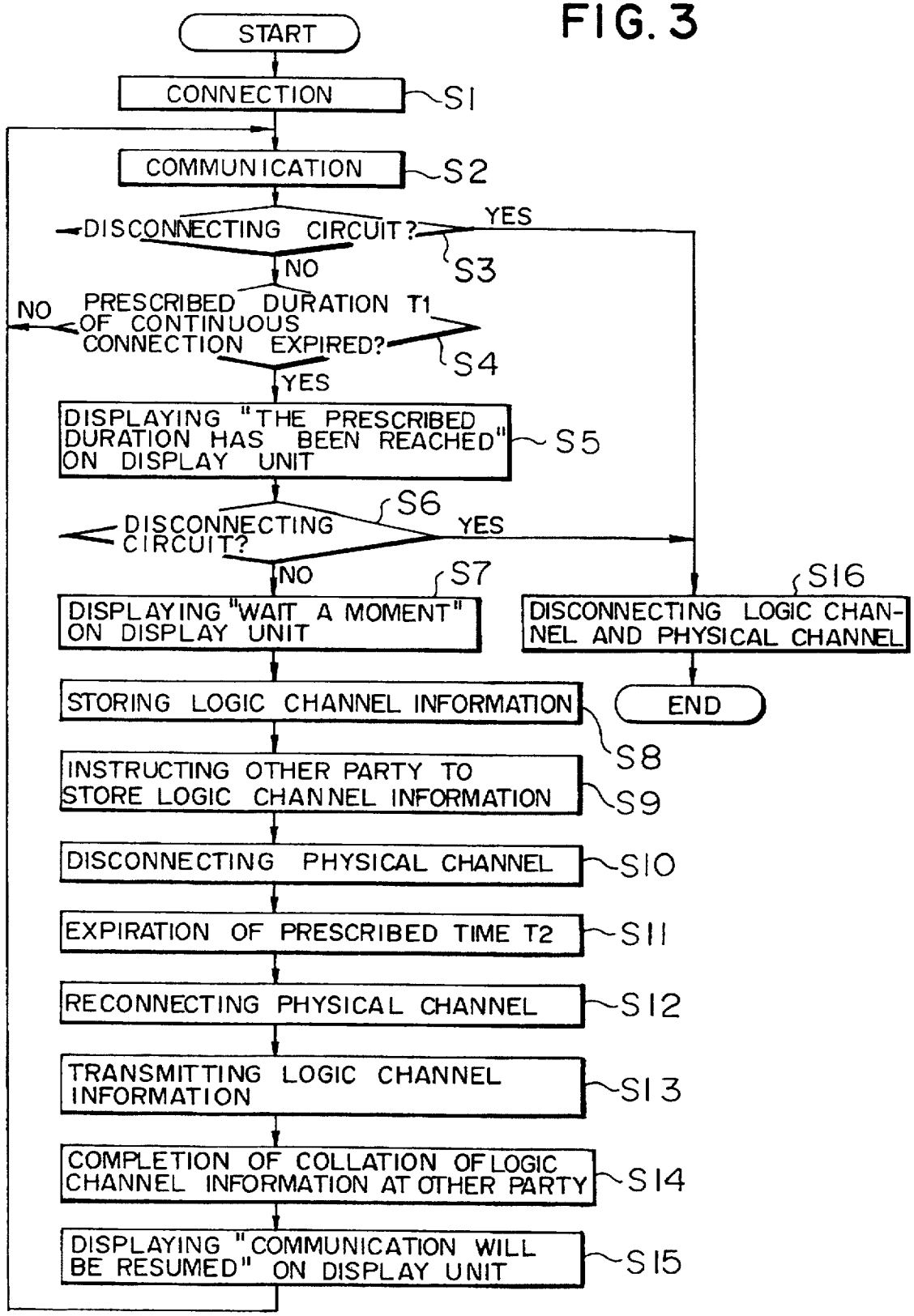

RECONNECTION APPARATUS IN DIRECT COMMUNICATION SYSTEM BETWEEN SUBSIDIARY RADIOTELEPHONE UNITS

BACKGROUND OF THE INVENTION

1. Field of the Invention

This invention relates to a reconnection apparatus in a direct communication system between subsidiary radiotelephone units and, particularly to a reconnection apparatus for direct communication between subsidiary radiotelephone units of a second-generation cordless telephone system (PHS: Personal Handyphone System), or the like.

2. Description of the Prior Art

As described in RCR-STD (Research and Development Center for Radio Systems - Standard) which is recommended specifications for mobile communication terminals, in direct communication between subsidiary radiotelephone units of PHS, MCA system or the like, a limited duration of a continuous connection (to be simply referred to as "a duration of a continuous connection" hereinafter) for one time of connection between terminals is prescribed.

In direct communication between subsidiary radiotelephone units of PHS, the duration of a continuous connection is prescribed to be 3 minutes. When the connection time between a terminal of a user and another terminal expires the prescribed duration of a continuous connection, a disconnection instruction is forcedly sent from a circuit control station or a control unit of a user's station to the terminal of other party to disconnect a communication circuit which is currently connected though the user likes to continue connection between his(her) terminal and the terminal of the other party.

In this respect, the limitation of a connection duration is for a time period during which these terminals are continuously connected and not for a time period during which the users of these terminals speak with each other over the telephone.

In other words, as shown in FIGS. 1A and 1B, when a connection request signal is output from one terminal 1 to the other terminal 2, a connection permit signal is output from the terminal 2 to the terminal 1 to carry out connection between the terminals 1 and 2 (step S61 of FIG. 1A).

After the terminals 1 and 2 have been connected, telephone communication is carried out between the terminals 1 and 2 (step S62 of FIG. 1A). In the case where a user disconnects a circuit when the communication time between the terminals 1 and 2 does not reach the prescribed duration T1 of a continuous connection, the circuit between the terminals 1 and 2 is disconnected immediately by depressing a disconnection key and communication between the terminals 1 and 2 is terminated.

For instance, when the user of the terminal 1 depresses the disconnection key, the terminal 1 detects a disconnection (step S63 of FIG. 1A), it sends a disconnection instruction signal to the terminal 2 to disconnect a physical channel of a speaking circuit between the terminals 1 and 2 and reset a logic channel (step S65 of FIG. 1A). When the user of the terminal 2 depresses the disconnection key, the logic channel and physical channel between the terminals 1 and 2 are disconnected likewise.

On the other hand, even in the case where the user of the terminal 1 has no intention to disconnect the circuit, when the communication time has reached the prescribed duration T1 of a continuous connection (step S64 of FIG. 1A), a disconnection instruction signal is automatically sent from the terminal 1 to the terminal 2 in disregard of the presence or absence of an instruction from the user. Thereby, the physical channel of the speaking circuit between the terminals 1 and 2 is disconnected and the logic channel is reset (S65 of FIG. 1A).

As described above, when the communication time has reached the prescribed duration T1 of a continuous connection while telephone communication is carried out continuously between the terminals 1 and 2, the circuit which is currently connected is prescribed to be disconnected even if the users of the terminals 1 and 2 have no intention to disconnect the circuit.

In the above direct communication between subsidiary radiotelephone units of PHS, or the like of the prior art, even if the users of terminals wanted to continue communication, when the prescribed duration T1 of a continuous connection has been reached, the circuit currently used for a call is forcedly disconnected. Therefore, to continue communication, the user of the terminal must carry out again the processing of connecting the circuit with a terminal which the terminal has been connected with so as to resume communication with the same party.

Stated more specifically, in the prior art, the users of the terminals 1 and 2 must carry out the operation as shown in FIGS. 1C and 1D. That is, the user of the terminal 1 carries out the processing of connection with the other party by inputting an ID number indicating the address of the terminal 2 (step S71 of FIG. 1C), confirms the completion of connection with the terminal 2 (step S72 of FIG. 1C) and confirms the start of communication with the user of the terminal 2 (step S73 of FIG. 1C).

When the user of the terminal 2 has confirmed the reception of a connection request from the terminal 1 at this point (step S91 of FIG. 1D), he(she) confirms the completion of connection with the terminal 1 by carrying out processing required for connection with the terminal 1 (step S92 of FIG. 1D) and then confirms the start of communication with the user of the terminal 1 (step S93 of FIG. 1D).

When the users of the terminals 1 and 2 complete communication within the prescribed duration T1 of a continuous connection (step S74 of FIG. 1C and step S94 of FIG. 1D), communication is terminated by depressing the disconnection key (step S75 of FIG. 1C and step S95 of FIG. 1D).

In contrast to this, in the case where the user of the terminal 1 does not complete communication within the prescribed duration T1 of a continuous connection (step S74 of FIG. 1C), when the prescribed duration T1 of a continuous connection has been reached (step S76 of FIG. 1C), communication with the user of the terminal 2 is forcedly terminated (step S77 of FIG. 1C).

Similarly, in the case where the user of the terminal 2 does not complete communication within the prescribed duration T1 of a continuous connection (step S94 of FIG. 1D), communication with the user of the terminal 1 is forcedly terminated (step S97 of FIG. 1D) if the forced termination of communication is due to the fact that the terminal 1 has reached the prescribed duration T1 of a continuous connection or due to the fact that the terminal of a user has reached the prescribed duration T1 of a continuous connection (step S96 of FIG. 1D).

When communication with the user of the terminal 2 is forcedly terminated, the user of the terminal 1 judges whether the forcedly terminated communication is to be continued or not after an elapse of a prescribed wait time T2 (step S78 of FIG. 1C). When the user of the terminal 1 decides that the forced terminated communication is not to be continued, communication with the user of the terminal 2 is terminated (step S79 of FIG. 1C).

When the user of the terminal 1 desires a further continuation of the forcedly terminated communication after the communication time reaches the prescribed duration T1 of a continuous connection, as in the processing of step S71 and after in FIG. 1C, he/she carries out the processing of connection with the other party by inputting an ID number indicating the address of the terminal 2 (step S80 of FIG. 1C), then confirms the completion of connection with the terminal 2 (step S81 of FIG. 1C) and confirms the start of communication with the user of the terminal 2 (step S82 of FIG. 1C).

While, when communication with the user of the terminal 1 is forcedly continued, the user of the terminal 2 judges whether there is a reconnection request from the user of the terminal 1 after an elapse of the wait time T2 (step S98 of FIG. 1D) and terminates communication with the user of the terminal 1 when there is no reconnection request (step S99 of FIG. 1D).

When there is a reconnection request from the user of the terminal 1 for the forcedly terminated communication after an elapse of the wait time T2, as in the processing of step S91 and after in FIG. 1D, the user of the terminal 2 confirms the reception of the connection request from the terminal 1 (step S100 of FIG. 1D), confirms the completion of connection with the terminal 1 by carrying out required processing for connection with the terminal 1 (step S101 of FIG. 1D), and confirms the start of communication with the user of the terminal 1 (step S102 of FIG. 1D).

Also in this case, when the users of the terminals 1 and 2 complete communication within the prescribed duration T1 of a continuous connection (step S83 of FIG. 1C, step S103 of FIG. 1D), communication is terminated by depressing the disconnection key (step S84 of FIG. 1C, step S104 of FIG. 1D).

When the user of the terminal 1 does not complete communication within the prescribed duration T1 of a continuous connection (step S83 of FIG. 1C) and the prescribed duration T1 of a continuous connection has been reached (step S85 of FIG. 1C), communication with the user of the terminal 2 is forcedly terminated (step S86 of FIG. 1C).

Similarly, when the user of the terminal 2 does not complete communication within the prescribed duration T1 of a continuous connection (step S103 of FIG. 1D), communication with the user of the terminal 1 is forcedly terminated (step S106 of FIG. 1D) if the forced termination of communication is due to the fact that the terminal 1 has reached the prescribed duration T1 of a continuous connection or the terminal of the user of the terminal 2 has reached the prescribed duration T1 of a continuous connection (step S105 of FIG. 1D).

Since communication is forcedly terminated each time the prescribed duration T1 of a continuous connection has been reached, in order to continue communication, the users of the terminals 1 and 2 must repeat the above operation many times while they continue communication.

SUMMARY OF THE INVENTION

In view of the above circumstances, it is an object of the present invention to provide a reconnection apparatus in a direct communication system between subsidiary radiotelephone units, which is capable of resuming communication with other party without repeating the processing of connecting a circuit with the terminal of the other party even when the communication time has reached a prescribed duration of a continuous connection.

To attain the above object, according to a first basic aspect of the present invention, there is provided a reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection has expires;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction; and reconnection means for carrying out reconnection with the connection destination of the direct communication based on the connection destination information and the connection information of the storing means when the judging means judges that there is the communication continuation instruction.

To attain the above objects, according to a second basic aspect of the invention, there is provided a reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection has expires;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

means for carrying out reconnection with the connection destination based on the connection destination information and the connection information stored in the storing means when the judging means judges that there is the communication continuation instruction;

means for sending connection information stored in the storing means to the connection destination after the execution of the reconnection; and means for instructing resumption of direct communication with the connection destination when a message that the result of collation between connection information transmitted to the connection destination and connection information stored according to a storing instruction to the connection destination is normal is transmitted from the connection destination.

Another reconnection apparatus in a direct communication system between subsidiary radiotelephone units according to the present invention further comprises:

storing means for storing the connection information when the storage of the connection information is instructed by the connection destination; and collation means for collating connection information with connection information stored in the storing means when the former connection information is transmitted from the connection destination and sending the result of the collation to the connection destination, in addition to the above constitution.

Further, the reconnection means of the reconnection apparatus according to the first and second basic aspects of the invention is constituted to carry out reconnection with the connection destination by an unused circuit which has been searched based on the connection destination information and the connection information of the storing means.

According to the present invention embodied as described above, in a reconnection apparatus of a direct communication system between subsidiary radiotelephone units in which connection between the subsidiary radiotelephone units is forcedly disconnected when direct communication is carried out between the subsidiary radiotelephone units over a prescribed duration of a continuous connection, the passage of the prescribed duration of a continuous connection is detected and informed immediately before the prescribed duration of a continuous connection has expires, at least information on the connection destination of direct communication and information on connection between the subsidiary radiotelephone units are stored when it is judged that there is a communication continuation instruction from the outside in response to the information, and reconnection with the connection destination of direct communication is carried out based on the connection destination information and the connection information. Therefore, the present invention has such an effect that communication with other party can be resumed without repeating the processing of connecting a circuit to the terminal of the other party even when the communication time has reached the prescribed duration of a continuous connection.

The above and many other advantages, features and additional objects of the present invention will become manifest to those versed in the art upon making reference to the following description and accompanying drawings in which preferred embodiments incorporating the principles of the present invention are shown by way of illustrative examples.

BRIEF DESCRIPTION OF THE DRAWINGS

FIG. 1A is a flow chart showing the operation of transmission and reception sides, FIG. 1B is a sequence chart showing the operation of the entire communication system, FIG. 1C is a flow chart showing the operation of a user on a transmission side, and FIG. 1D is a flow chart showing the operation of a user on a reception side;

FIG. 2A shows the transmission side and FIG. 2B shows the reception side;

FIG. 3 is a flow chart showing the operation of a transmission side according to the embodiment of the present invention;

DETAILED DESCRIPTION OF THE PREFERRED EMBODIMENT

A description is first given of the function of the present invention.

A prescribed duration of a continuous connection in a direct communication system between subsidiary radiotelephone units is preset in a timer unit. During telephone communication, the timer unit gives interrupt notice to a control unit to temporarily store information on the current connection destination and connection information (logic channel information) in a memory unit immediately before the end of the prescribed duration of a continuous connection. After the disconnection of the circuit, the circuit is reconnected based on these pieces of information to enable communication with the same party.

At this point, the logic channel information temporarily stored in the memory unit is transmitted to the connection destination and logic channel information before the disconnection of the circuit is collated with the transmitted logic channel information at the connection destination, whereby it is possible to carry out communication with the same party after the reconnection with the connection destination under the same communication conditions. Thereby even if the communication time reaches the prescribed duration of a continuous connection, communication with the same connection destination can be resumed without repeating the processing of connecting a circuit to the terminal of the connection destination.

Figure 1A:
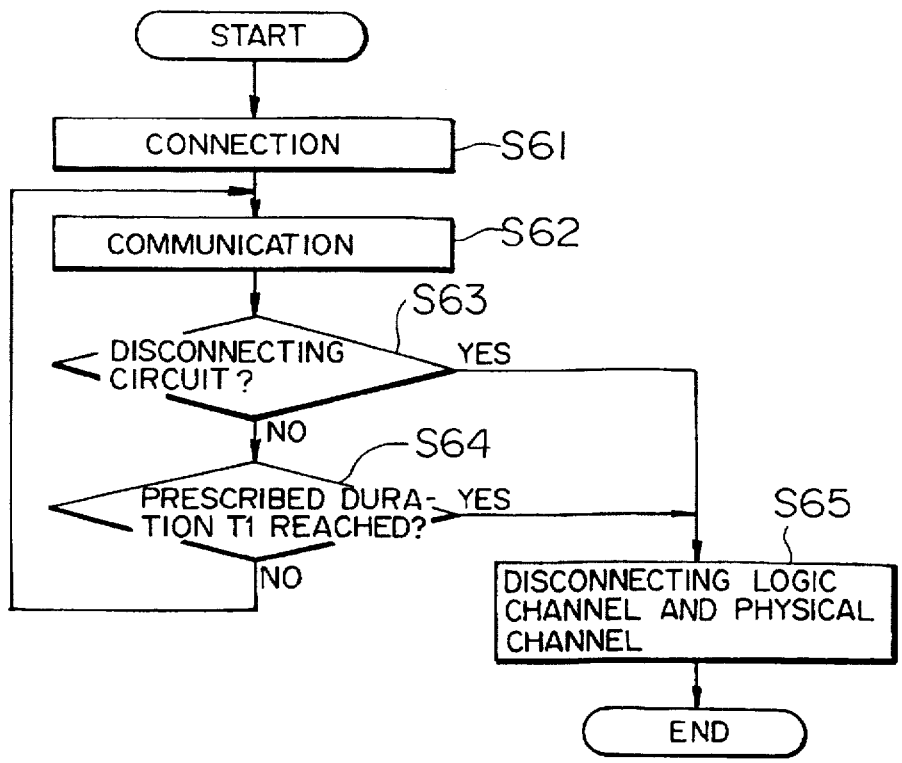
FIGS. 1A to 1D show the prior art.
Figure 1B:
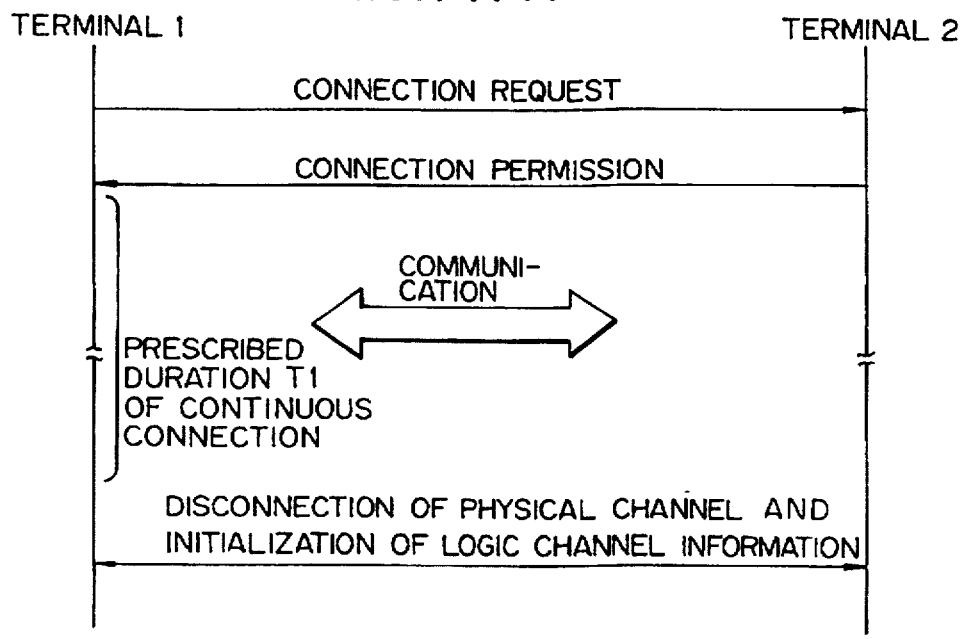
Figure 1C:
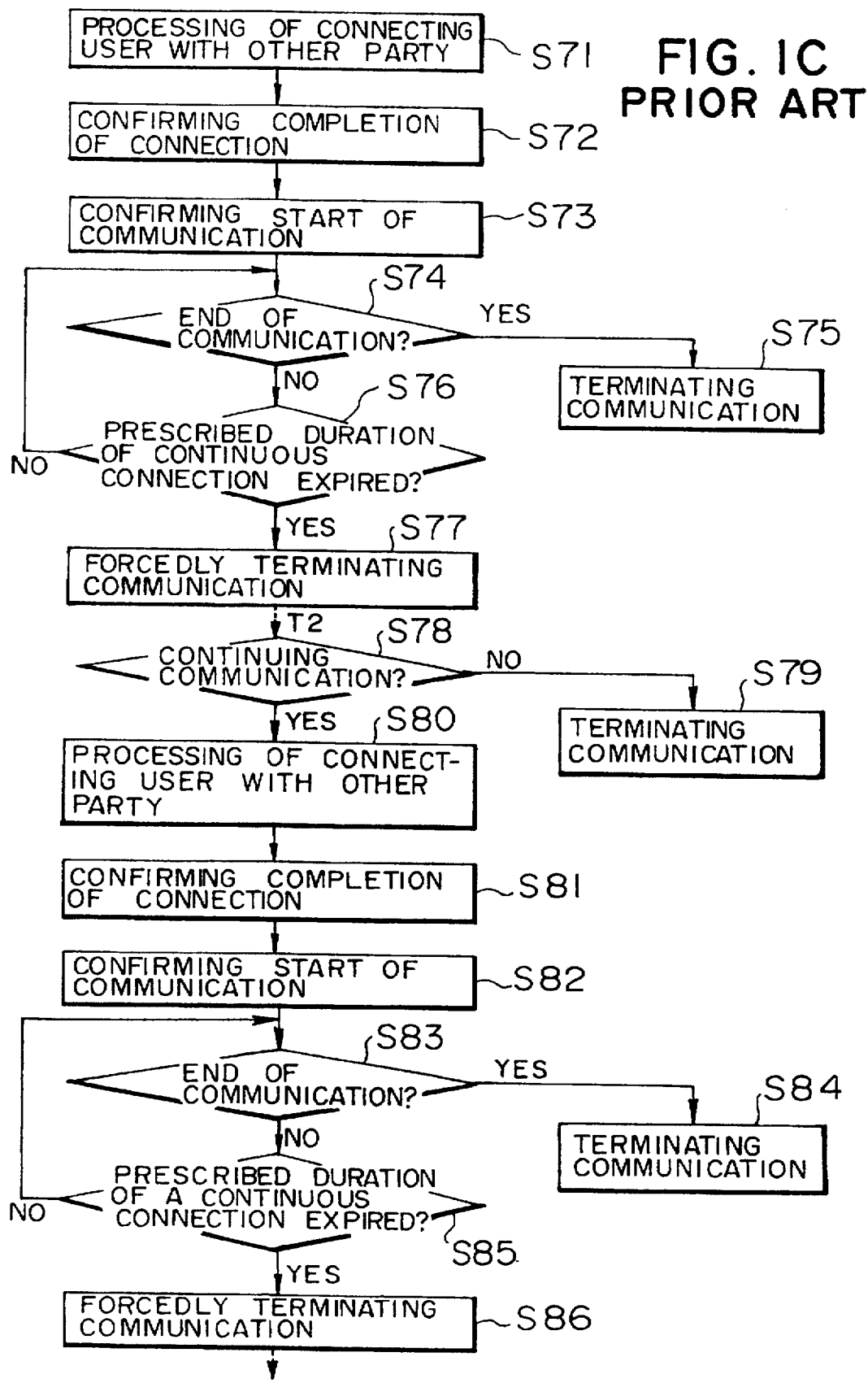
Figure 1D:
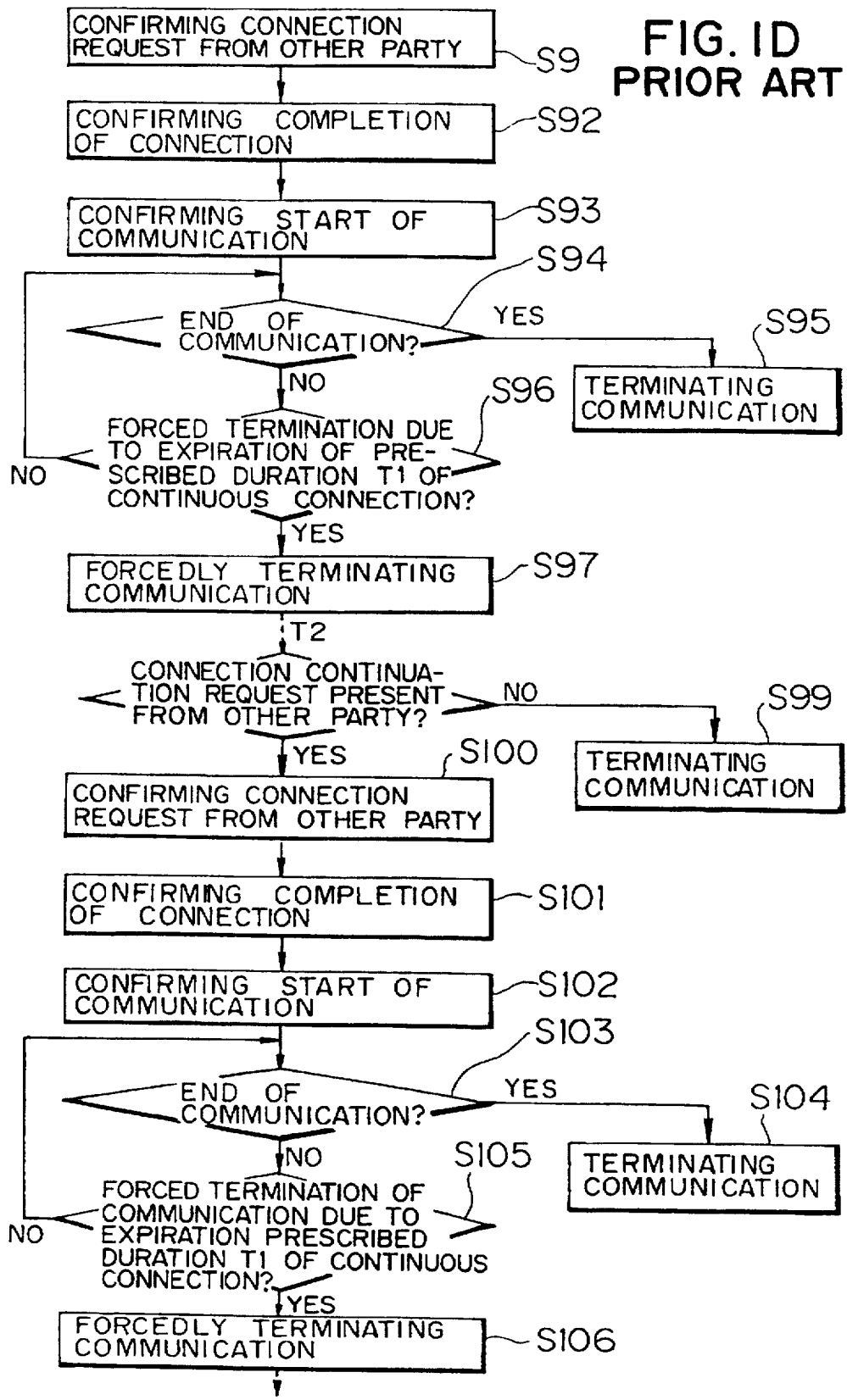
Figure 2A:
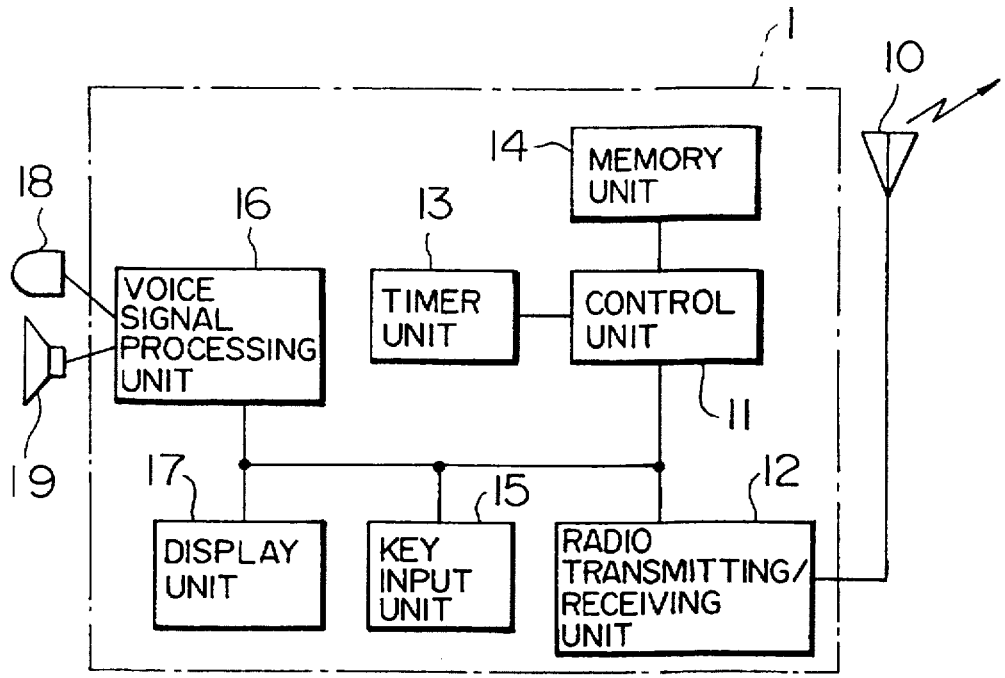
FIGS. 2A and 2B are block diagrams showing the entire configuration of an embodiment of the present invention.
Figure 2B:
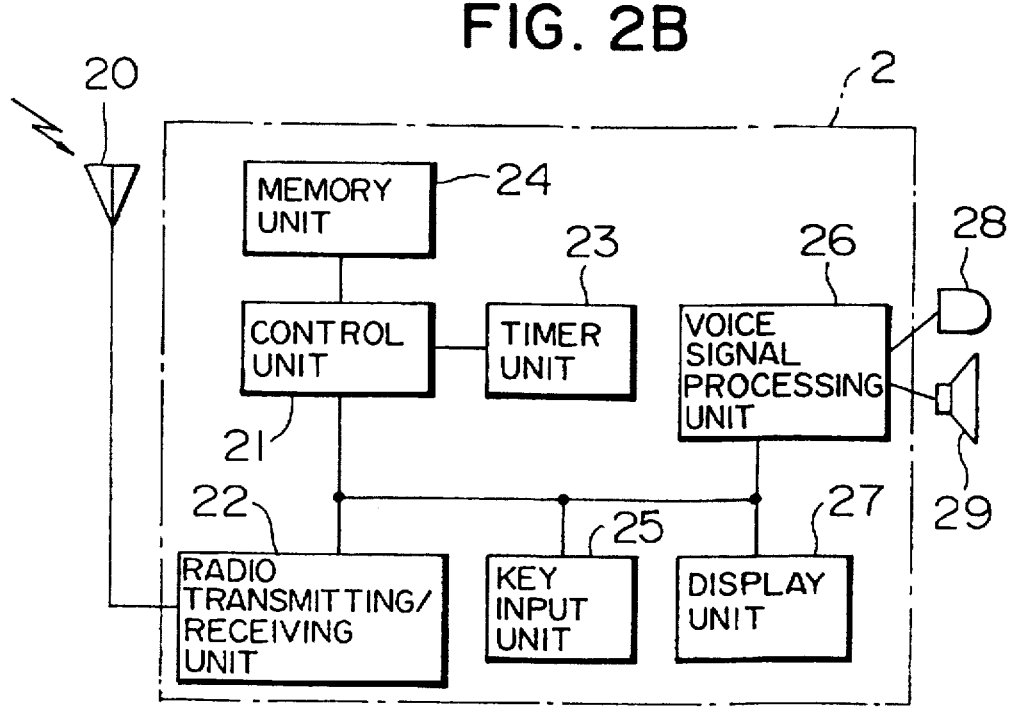

A description is subsequently given of an embodiment of the present invention with reference to the accompanying drawings. FIGS. 2A and 2B are block diagrams showing the entire configuration of the embodiment of the present invention. In FIGS. 2A and 2B, terminals 1 and 2 comprise antenna 10 and 20, control units 11 and 21, radio transmitting/receiving units 12 and 22, timer units 13 and 23, memory units 14 and 24, key input units 15 and 25, voice signal processing units 16 and 26, display units 17 and 27, microphones 18 and 28, and speakers 19 and 29, respectively.

The control units 11 and 21 are operated by program control and control each circuit within the terminals 1 and 2, respectively. The radio transmitting/receiving units 12 and 22 carry out the processing of converting an electric signal received from the voice signal processing units 16 and 26 into a radio signal and transmitting the radio signal to the terminals 2 and 1 through the antennas 10 and 20 and the processing of converting a radio signal received from the terminals 2 and 1 through the antennas 10 and 20 into an electric signal and transmitting the electric signal to the voice signal processing units 16 and 26, respectively.

The timer units 13 and 23 count a preset time value and give interrupt notice to the control units 11 and 21 immediately before the passage of the time value, respectively. For instance, T1 which is the prescribed duration of a continuous connection and T2 which is a wait time until reconnection between the terminal 1 and 2 are set in the timer units 13 and 23, and the timers 13 and 23 give interrupt notice to the control units 11 and 21 immediately before the count value reaches the time T1 or T2, respectively.

The memory units 14 and 24 temporarily stores various information according to an instruction from the control units 11 and 21, respectively. In other words, the memory units 14 and 24 have functions to write and read information according to an instruction from the control units 11 and 21, respectively, and store various information including identification information (ID numbers) of the terminals 1 and 2 and logic channel information (connection information) such as a logic channel number indicating a channel used.

The key input units 15 and 25 inform the control units 11 and 21 of a dial number input by the user and various instructions such as a disconnection instruction, respectively. The voice signal processing units 16 and 26 carry out the processing of converting a voice signal of the user from the microphones 18 and 28 into an electric signal for internal processing of the terminals 1 and 2 and the processing of converting a signal from the terminals 2 and 1 into a voice signal and outputting the voice signal from the speakers 19 and 29, respectively.

The display units 17 and 27 are each formed of an LCD (Liquid Crystal Display) or the like and display information from the control units 11 and 21 indicating the current status of the apparatus to inform the user.

Figure 4:
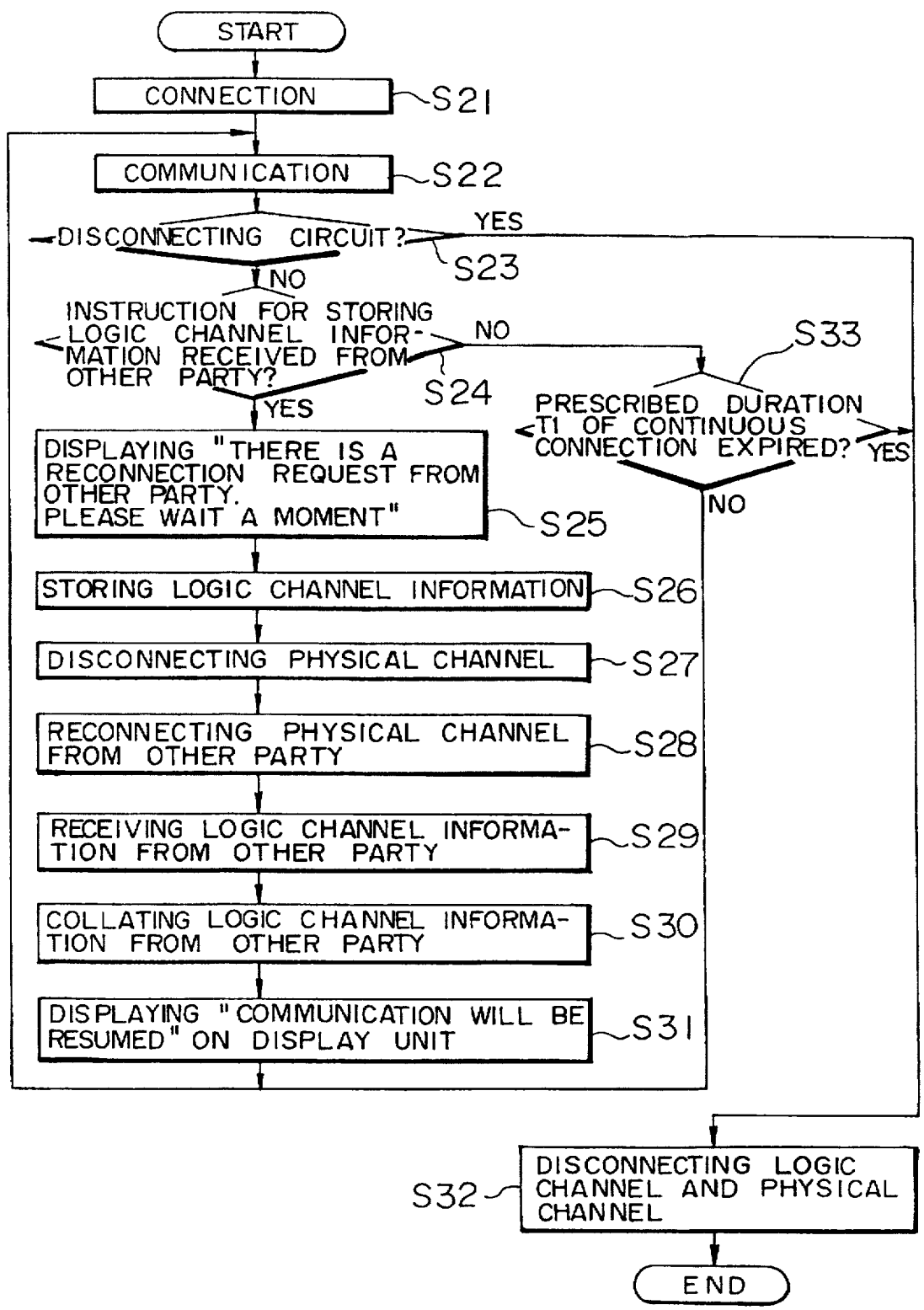
FIG. 4 is a flow chart showing the operation of a reception side according to the embodiment of the present invention.
Figure 5:
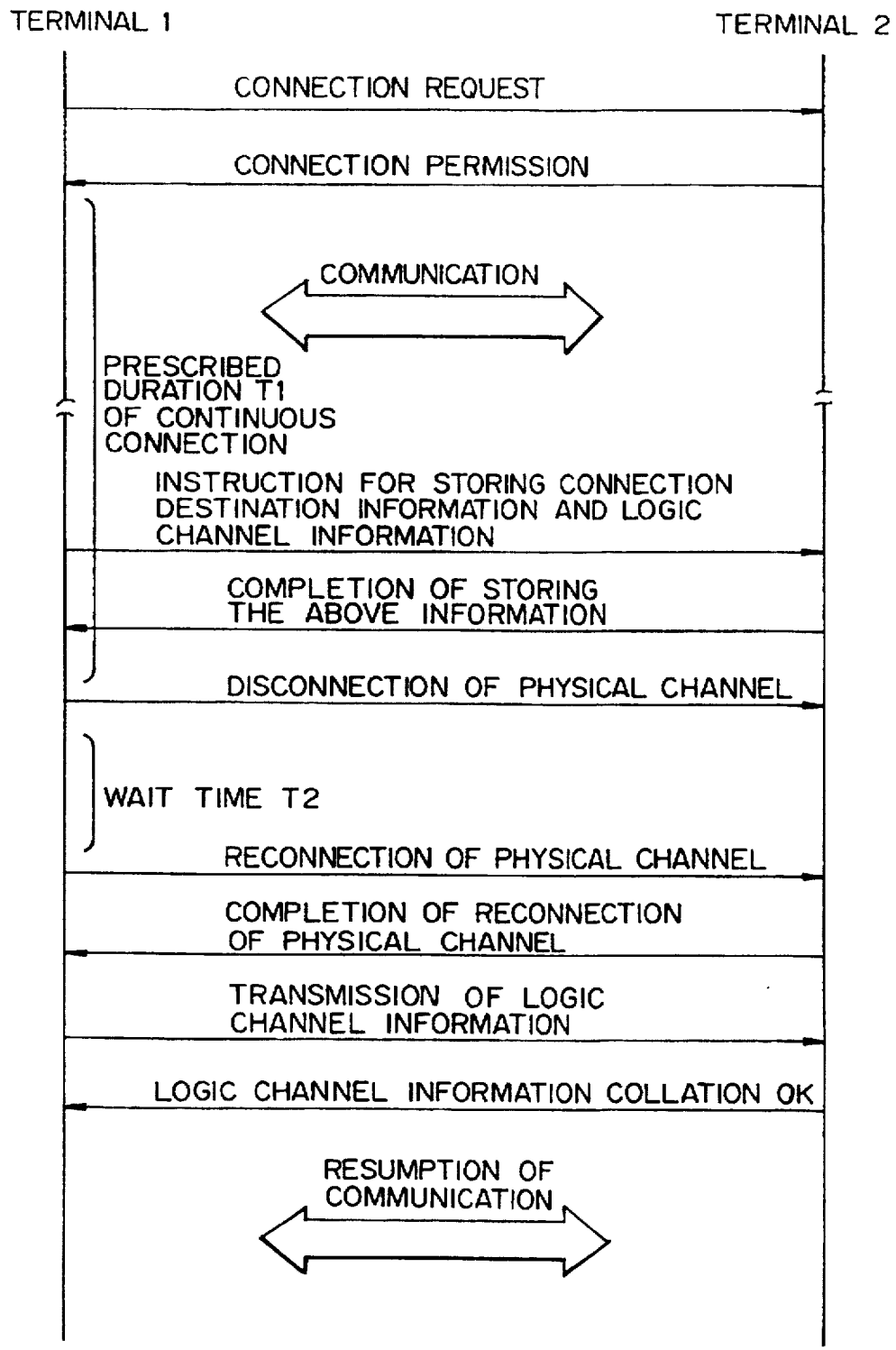
FIG. 5 is a sequence chart showing the operation of the entire communication system using the embodiment of the present invention.

FIG. 3 is a flow chart showing the operation of a transmission side in the embodiment of the present invention, FIG. 4 is a flow chart showing the operation of a reception side in the embodiment of the present invention, and FIG. 5 is a sequence chart showing the operation of the entire communication system using the embodiment of the present invention. With reference to these FIGS. 2A to 5, the operation of the embodiment of the present invention is described.

When the user of the terminal 1 inputs an ID number indicating the address of the terminal 2 into the key input unit 15, the terminal 1 transmits the ID number of the terminal 2 input into the key input unit 15 by the user from the key input unit 15 to the control unit 11 which in turns transmits a connection request signal to the terminal 2 through the radio transmitting/receiving unit 12 and the antenna 10.

When the terminal 2 receives the connection request signal from the terminal 1, the control unit 21 judges whether connection with the terminal 1 is possible by the connection request signal. When connection with the terminal 1 is possible, the control unit 21 transmits a connection permit signal to the terminal 1 through the radio transmitting/receiving unit 22 and the antenna 20.

At the point when the connection permit signal is received from the terminal 2, connection between the terminals 1 and 2 is completed (step S1 of FIG. 3, step S21 of FIG. 4), communication between the users of the terminals 1 and 2 is possible (step S2 of FIG. 3, step S22 of FIG. 4). At this point, the timers 13 and 23 start to count up the prescribed duration T1 of a continuous connection.

In the case where the users complete communication within the prescribed duration T1 of a continuous connection during communication between the terminals 1 and 2, when the user of the terminal 1 depresses the disconnection key (not shown) of the key input unit 15, the control unit 11 of the terminal 1 transmits a disconnection request signal to the terminal 2. The terminal 2 returns a disconnection answer signal to the disconnection request signal from the terminal 1.

The control unit 11 of the terminal 1 carries out disconnection processing by disconnecting the physical channel which is a radio circuit in response to the disconnection answer signal from the terminal 2 and initializing the logic channel information, and the control unit 21 of the terminal 2 carries out disconnection processing by disconnecting the physical channel which is a radio circuit in response to the disconnection request signal from the terminal 1 and initializing the logic channel information (steps S3 and S16 of FIG. 3 and steps S23 and S32 of FIG. 4).

When the user of the terminal 2 depresses the disconnection key (not shown) of the key input unit 25, the logic channel and the physical channel with the terminal 1 are also disconnected as in the above processing.

On the other hand, in the case where the users do not complete communication within the prescribed duration T1 of a continuous connection during communication between the terminals 1 and 2, when the timer unit 13 in the terminal 1 on the transmission side detects the passage of the prescribed duration T1 of a continuous connection and gives interrupt notice to the control unit 11 (step S4 of FIG. 3), the control unit 11 displays a message "The prescribed duration T1 of a continuous connection has been reached" on the display unit 17 in response to the interrupt notice (step S5 of FIG. 3). By displaying this message, the user of the terminal 1 is urged to desire whether communication is to be continued or discontinued.

Thereafter, the user of the terminal 1 reads the above message displayed on the display unit 17 and depresses the disconnection key of the key input unit 15 when he(she) judges that communication with the user of the terminal 2 is to be discontinued, or carries out no operation when he(she) judges that communication is to be continued. Therefore, the control unit 11 judges the continuation or discontinuation of communication with the user of the terminal 2 according to the depression state of the disconnection key of the key input unit 15 (step S6 of FIG. 3).

When the disconnection key of the key input unit 15 is depressed, the control unit 11 carries out disconnection processing by disconnecting the physical channel and initializing the logic channel information as in the above disconnection processing (step S16 of FIG. 3).

However, the control unit 11 judges that communication is to be continued when the disconnection key of the key input unit 15 is not depressed for a preset time, invalidates the reception of voice input from the microphone 18 in the voice signal processing unit 16 to invalidate voice input from the user, and displays a message "Wait a moment" on the display unit 17 (step S7 of FIG. 3). With this message, the use of the terminal 1 by the user is inhibited to prevent the termination of communication by mistake.

At the same time, the control unit 11 temporarily stores the ID number of the terminal 1, the ID number of the terminal 2 which is the current connection destination and logic channel information including a logic channel number currently connected in the memory unit 14 (step S8 of FIG. 3) and instructs the control unit 21 of the terminal 2 to temporarily store logic channel information including a logic channel number currently connected (step S9 of FIG. 3).

When the control unit 21 of the terminal 2 receives the instruction to temporarily store the logic channel information from the terminal 1 (step S24 of FIG. 4), it invalidates the reception of voice input from the microphone 28 in the voice signal processing unit 26 to invalidate voice input from the user, and displays a message "A reconnection request has been received from the other party. Please wait a moment" on the display unit 27 (step S25 of FIG. 4).

With this message, the use of the terminal 2 by the user is inhibited to prevent the termination of the communication by mistake. At the same time, the control unit 21 temporarily stores logic channel information including a logic channel number currently connected in the memory unit 24 (step S26 of FIG. 4) and wait for the disconnection of the physical channel by the terminal 1.

If the prescribed duration T1 of a continuous connection is reached (step 33 of FIG. 4) before the instruction to temporarily store the logic channel information is input from the terminal 1 (step S24 of FIG. 4), the control unit 21 of the terminal 2 carries out discontinuation processing by disconnecting the physical channel and initializing the logic channel information (step S32 of FIG. 4).

Thereafter, the control unit 11 disconnects the physical channel when the prescribed duration of a continuous connection has been reached (step S10 of FIG. 3), instructs the timer unit 13 to reset the prescribed duration T1 of a continuous connection and to count up the wait time T2 subsequently, and then temporarily stops the processing.

The timer unit 13 starts to count up the prescribed time T2 from that time and gives interrupt notice to the control unit 11 when the wait time T2 has been reached (step S11 of FIG. 3). When the control unit 11 receives the interrupt notice from the timer unit 13, it resumes the processing that has been stopped, reads the logic channel information and the like temporarily stored in the memory unit 14 and searches for an unused physical channel based on the information.

When the control unit 11 finds an unused physical channel, it connects a circuit to the terminal 2 which has been connected before the disconnection of the physical channel based on the logic channel information and the like temporarily stored in the memory unit 14 and reconnects the physical channel (step S12 of FIG. 3).

When the control unit 11 completes the reconnection of the physical channel, it transmits an instruction for the collation of logic channel information to the terminal 2 and the logic channel information temporarily stored in the memory unit 14 to the terminal 2 (step S13 of FIG. 3).

When the terminal 2 receives the disconnection of the physical channel from the terminal 1 (step S27 of FIG. 4), it resets the prescribed duration T1 of a continuous connection in the timer unit 23 and waits for a reconnection signal from the terminal 1.

When the terminal 2 receives a reconnection signal from the terminal 1 (step S28 of FIG. 4), followed by the instruction for the collation of logic channel information and the logic channel information from the terminal 1 (step S29 of FIG. 4), it compares and collates the logic channel information from the terminal 1 with logic channel information temporarily stored in the memory unit 24 (step S30 of FIG. 4).

When the result of this comparison and collation is normal, the control unit 21 transmits a logic channel comparison and collation OK signal to the terminal 1 and changes the display contents of the display unit 27 to a message "Communication will be resumed" (step S31 of FIG. 4). The control unit 21 erases the display of the display unit after an elapse of several seconds and validates input from the voice signal processing unit 26. At this point, communication is resumed for the user of the terminal 2 (step S22 of FIG. 4).

When the result of this comparison and collation is abnormal, the control unit 21 informs the terminal 1 that something was wrong with the comparison and collation of the logic channel information and changes the display contents of the display unit 27 to a message "Something is wrong with the comparison and collation of logic channel information". This processing operation is not described in FIGS. 3 and 4.

When the control unit 11 receives the logic channel comparison and collation OK signal from the terminal 2 (step S14 of FIG. 3), it changes the display contents of the display unit 17 to a message "Communication will be resumed."(step S15 of FIG. 3). The control unit 11 erases the display of the display unit 17 after an elapse of several seconds and validates input from the voice signal processing unit 16. At this point, communication is resumed for the user of the terminal 1 (step S2 of FIG. 3).

Figure 6:
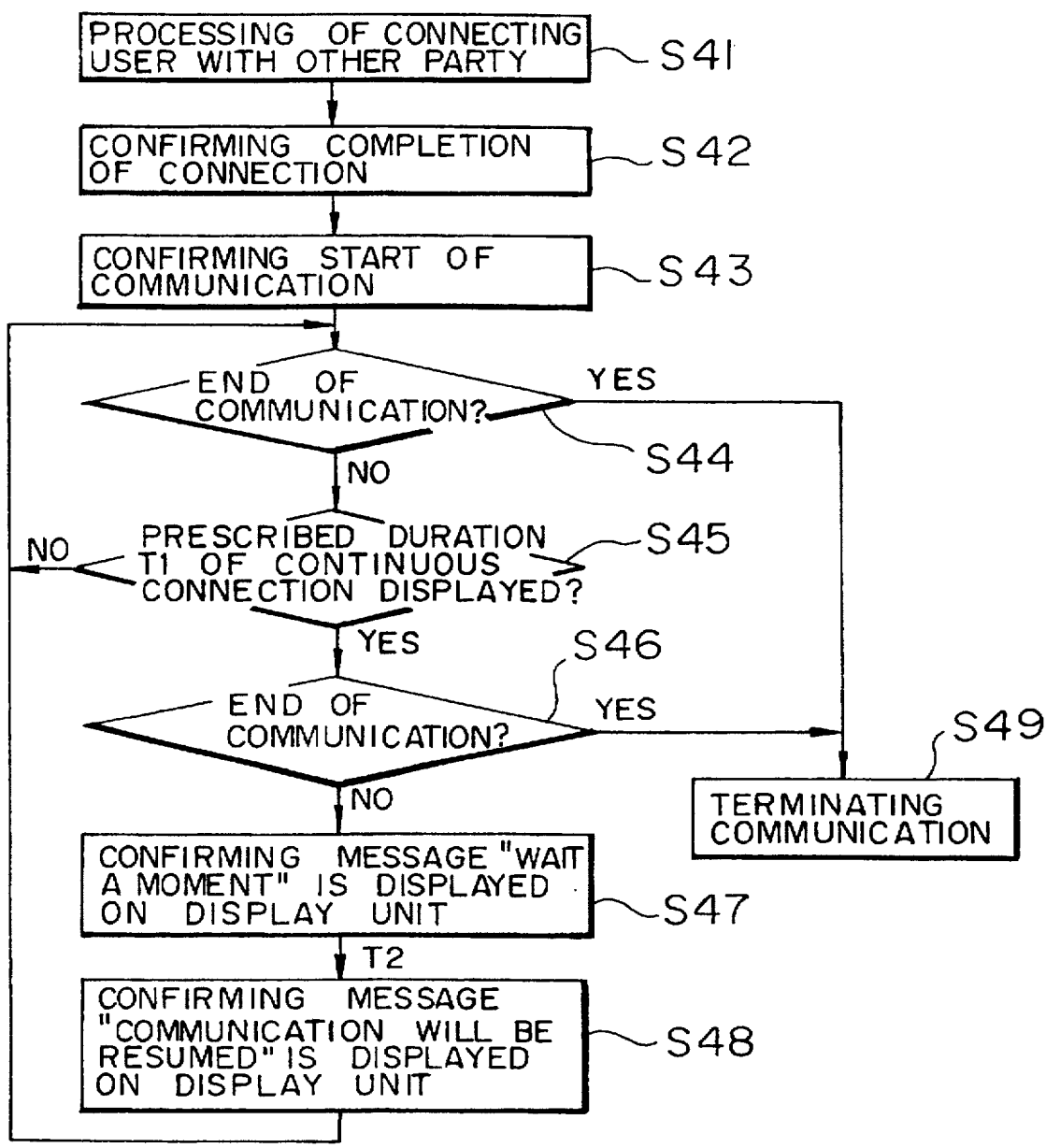
FIG. 6 is a flow chart showing the operation of a user on a transmission side according to the embodiment of the present invention.
Figure 7:
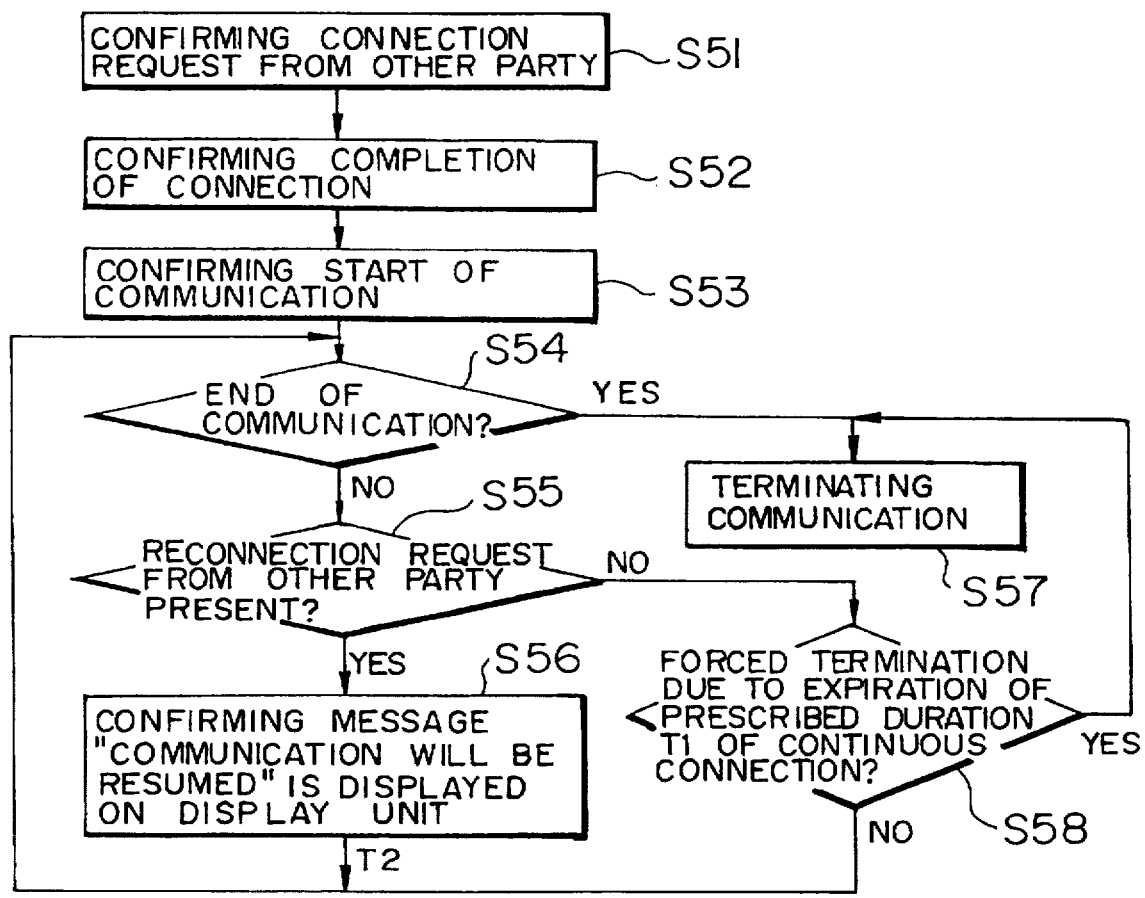
FIG. 7 is a flow chart showing the operation of a user on a reception side according to the embodiment of the present invention.

FIG. 6 is a flow chart showing the operation of the user on the transmission side according to the embodiment of the present invention and FIG. 7 is a flow chart showing the operation of the user on the reception side according to the embodiment of the present invention.

After the user of the terminal 1 carries out connection processing with the other party by inputting an ID number indicating the address of the terminal 2 into the key input unit 15 and the like (step S41 of FIG. 6), he(she) confirms the completion of connection with the terminal 2 (step S42 of FIG. 6) and confirms the start of communication with the user of the terminal 2 (step S43 of FIG. 6).

When the user of the terminal 2 confirms the reception of a connection request from the terminal 1 at this point (step S51 of FIG. 7), he(she) carries out required processing for connection with the terminal 1, confirms the completion of connection with the terminal 1 (step S52 of FIG. 7), and confirms the start of communication with the user of the terminal 1 (step S53 of FIG. 7).

When the users of the terminal 1 and 2 complete their communication within the prescribed duration T1 of a continuous connection (step S44 of FIG. 6, step S54 of FIG. 7), they terminate communication by depressing the disconnection key of the key input units 15 and 25, respectively (step S49 of FIG. 6, step S57 of FIG. 7).

In contrast to this, when the user of the terminal 1 does not complete communication within the prescribed duration T1 of a continuous connection (step S44 of FIG. 6), he(she) confirms whether a message "The prescribed duration T1 of a continuous connection has been reached" is displayed on the display unit 17 (step S45 of FIG. 6).

In the case where the user of the terminal 1 terminates communication when the above message is displayed on the display unit 17 (step S46 of FIG. 6), he(she) terminates communication by depressing the disconnection key of the key input unit 15 as described above (step S49 of FIG. 6).

In the case where the user of the terminal 1 does not terminate communication when the above message is displayed on the display unit 17 (step S46 of FIG. 6), he(she) confirms that a message "Wait a moment" is displayed on the display unit 17 (step S47 of FIG. 6), and then confirms that a message "Communication will be resumed" is displayed on the display unit 17 (step S48 of FIG. 6) to return to communication with the user of the terminal 2.

In this case, when the user of the terminal 2 does not complete communication within the prescribed duration T1 of a continuous connection (step S54 of FIG. 7), he(she) confirms whether the message that there is a reconnection request from the terminal 1 is displayed on the display unit 27 (step S55 of FIG. 7).

If communication is forcedly terminated due to the fact that the prescribed duration T1 of a continuous connection has been reached when the message that there is a reconnection request from the terminal 1 is not displayed on the display unit 27 (step S58 of FIG. 7), he(she) terminates communication by depressing the disconnection key of the key input unit 25 as in the case described above (step S57 of FIG. 7).

When the message that there is a reconnection request from the terminal 1 is displayed on the display unit 27, the user of the terminal 2 confirms that a message "Communication will be resumed" is displayed on the display unit 27 (step S56 of FIG. 7) and returns to communication with the user of the terminal 1.

As described above, according to the embodiment of the present invention, once the users of the terminals 1 and 2 start telephone communication with each other, even when communication is forcedly terminated due to the fact that the prescribed duration of a continuous connection has been reached, they can resume communication with each other without repeating circuit connection processing simply by confirming the display of the display units 17 and 27 without any operation.

In this way, when the timer units 13 and 23 detect the passage of the prescribed duration T1 of a continuous connection, they inform the control units 11 and 21 of the expiration of the prescribed duration T1 of a continuous connection immediately before the prescribed duration T1 of a continuous connection expires. When the control units 11 and 21 judge that there is a communication continuation instruction from the outside in response to the information, they store at least ID numbers of the terminals 1 and 2 and logic channel information in the memory units 14 and 24 and carry out reconnection with the connection destination based on the ID numbers of the terminals 1 and 2 and the logic channel information. Therefore, when the circuit is forcedly disconnected in disregard of the intention of a user to continue or discontinue communication during communication since a duration of a continuous connection is prescribed in the infrastructure specifications, the user does not need to carry out connection operation with the other party again after an expiration of the prescribed wait time T2.

Consequently, even when the communication time has reached the prescribed duration of a continuous connection, the user can resume communication with the other party without repeating circuit connection processing with the terminal of the other party.

When the control unit 11 and 21 are informed of the expiration of the prescribed duration T1 of a continuous connection by the timer units 13 and 23, they instruct the terminals 2 and 1 connected therewith to store logic channel information and transmit logic channel information to the terminals 2 and 1 after reconnection to instruct the collation of these logic channel information, respectively. When the result of the collation of these logic channel information is normal, communication is resumed so that the users of the terminals 1 and 2 can communicate with the same connection destination under the same communication conditions after reconnection with the connection destination.

While preferred embodiments of the invention have been described, it is to be distinctly understood that the invention is not limited thereto but may be otherwise variously embodied as follows within the scope of the accompanying claims.

(1) A reconnection apparatus in a direct communication system between subsidiary radiotelephone units which forcedly disconnects connection between the subsidiary radiotelephone units when direct communication is carried out between the subsidiary radiotelephone units for a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

judging means for judging whether there is a communication continuation instruction from the outside in response to the information from the detection means;

first storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

second storing means for storing the connection information when it is instructed to store the connection information by the connection destination;

means for carrying out reconnection with the connection destination based on the connection destination information and the connection information stored in the first storing means when the judging means judges that there is the communication continuation instruction;

means for sending the connection information stored in the first storing means to the connection destination after the execution of the reconnection;

means for collating connection information with connection information stored in the second storing means when the former connection information is transmitted from the connection destination and sending the result of the collation to the connection destination; and means for instructing resumption of direct communication with the connection destination when result of the collation from the connection destination is normal.

(2) The reconnection apparatus as recited in (1), wherein the means for carrying out reconnection is constituted to carry out reconnection with the connection destination by an unused circuit which has been searched based on the connection destination information and the connection information of the storing means.

(3) A reconnection apparatus in a direct communication system between subsidiary radiotelephone units which forcedly disconnects connection between the subsidiary radiotelephone units when direct communication is carried out between the subsidiary radiotelephone units for a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction; and means for carrying out reconnection with the connection destination based on the connection destination information and the connection information of the storing means after an elapse of a preset predetermined time from the detection of the expiration of the prescribed duration of a continuous connection when the judging means judges that there is the communication continuation instruction.

(4) The reconnection apparatus as recited in (3) wherein the means for carrying out reconnection is constituted to carry out reconnection with the connection destination by an unused circuit which has been searched based on the connection destination information and the connection information of the storing means.

(5) A reconnection apparatus in a direct communication system between subsidiary radiotelephone units which forcedly disconnects connection between the subsidiary radiotelephone units when direct communication is carried out between the subsidiary radiotelephone units for a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

means for carrying out reconnection with the connection destination based on the connection destination information and the connection information stored in the storing means after an elapse of a preset predetermined time from the detection of the passage of the prescribed duration of a continuous connection when the judging means judges that there is the communication continuation instruction;

means for sending the connection information stored in the storing means to the connection destination after the execution of the reconnection;

means for informing the outside that reconnection of direct communication with the connection destination is being carried out until the result of collation between connection information transmitted to the connection destination and connection information stored according to a storing instruction to the connection destination is transmitted; and means for informing the outside of resumption of direct communication with the connection destination when a message that the result of the collation is normal is transmitted from the connection destination.

(6) The reconnection apparatus as recited in (5) which further comprises storing means for storing the connection information when it is instructed to store the connection information by the connection destination and collation means for collating connection information with connection information stored in the storing means when the former connection information is transmitted from the connection destination and sending the result of the collation to the connection destination.

(7) The reconnection apparatus as recited in (5) and (6) wherein the means for carrying out reconnection is constituted to carry out reconnection with the connection destination by an unused circuit which has been searched based on the connection destination information and the connection information of the storing means.

(8) A reconnection apparatus in a direct communication system between subsidiary radiotelephone units which forcedly disconnects connection between the subsidiary radiotelephone units when direct communication is carried out between the subsidiary radiotelephone units for a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

first storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

second storing means for storing the connection information when it is instructed to store the connection information by the connection destination;

means for carrying out reconnection with the connection destination based on the connection destination information and the connection information stored in the first storing means when the judging means judges that there is the communication continuation instruction;

means for sending the connection information stored in the first storing means to the connection destination after the execution of the reconnection;

means for collating connection information with connection information stored in the second storing means when the former connection information is transmitted from the connection destination and sending the result of the collation to the connection destination;

means for informing the outside that reconnection of direct communication with the connection destination is being carried out until the result of the collation is transmitted from the connection destination; and means for informing the outside of resumption of direct communication with the connection destination when a message that the result of the collation is normal is transmitted from the connection destination.

(9) The reconnection apparatus as recited in (8) wherein the means for carrying out reconnection is constituted to carry out reconnection with the connection destination by an unused circuit which has been searched based on the connection destination information and the connection information of the storing means.

What is claimed is:

1. A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction; and means for carrying out reconnection with the connection destination of the direct communication based on the connection destination information and the connection information of the storing means when the judging means judges that there is the communication continuation instruction.

2. A reconnection apparatus according to claim 1 wherein the means for carrying out reconnection is constituted to carry out reconnection with the connection destination by an unused circuit which has been searched based on the connection destination information and the connection information of the storing means.

3. A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

means for carrying out reconnection with the connection destination based on the connection destination information and the connection information stored in the storing means when the judging means judges that there is the communication continuation instruction;

means for sending connection information stored in the storing means to the connection destination after the execution of the reconnection; and means for instructing resumption of direct communication with the connection destination when a message that the result of collation between connection information transmitted to the connection destination and connection information stored according to a storing instruction to the connection destination is normal is transmitted from the connection destination.

4. A reconnection apparatus according to claim 3 which further comprises:

storing means for storing the connection information when the storage of the connection information is instructed by the connection destination; and collation means for collating connection information with connection information stored in the storing means when the former connection information is transmitted from the connection destination and sending the result of the collation to the connection destination.

5. A reconnection apparatus according to claim 3, wherein the means for carrying out reconnection is constituted to carry out reconnection with the connection destination by an unused circuit which has been searched based on the connection destination information and the connection information of the storing means.

6. A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

judging means for judging whether there is a communication continuation instruction from the outside in response to the information from the detection means;

first storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

second storing means for storing the connection information when it is instructed to store the connection information by the connection destination;

means for carrying out reconnection with the connection destination based on the connection destination information and the connection information stored in the first storing means when the judging means judges that there is the communication continuation instruction;

means for sending the connection information stored in the first storing means to the connection destination after the execution of the reconnection;

means for collating connection information with connection information stored in the second storing means when the former connection information is transmitted from the connection destination and sending the result of the collation to the connection destination; and means for instructing resumption of direct communication with the connection destination when result of the collation from the connection destination is normal.

7. A reconnection apparatus according to claim 6, wherein the means for carrying out reconnection is constituted to carry out reconnection with the connection destination by an unused circuit which has been searched based on the connection destination information and the connection information of the storing means.

8. A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction; and means for carrying out reconnection with the connection destination based on the connection destination information and the connection information of the storing means after an elapse of a preset predetermined time from the detection of the expiration of the prescribed duration of a continuous connection when the judging means judges that there is the communication continuation instruction.

9. A reconnection apparatus according to claim 8, wherein the means for carrying out reconnection is constituted to carry out reconnection with the connection destination by an unused circuit which has been searched based on the connection destination information and the connection information of the storing means.

10. A reconnection apparatus in a direct communication system between subsidiary radiotelephone units is which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

means for carrying out reconnection with the connection destination based on the connection destination information and the connection information stored in the storing means after an elapse of a preset predetermined time from the detection of the expiration of the prescribed duration of a continuous connection when the judging means judges that there is the communication continuation instruction;

means for sending the connection information stored in the storing means to the connection destination after the execution of the reconnection;

means for informing the outside that reconnection of direct communication with the connection destination is being carried out until the result of collation between connection information transmitted to the connection destination and connection information stored according to a storing instruction to the connection destination is transmitted; and means for informing the outside of resumption of direct communication with the connection destination when a message that the result of the collation is normal is transmitted from the connection destination.

11. A reconnection apparatus according to claim 10 which further comprises:

storing means for storing the connection information when it is instructed to store the connection information by the connection destination; and collation means for collating connection information with connection information stored in the storing means when the former connection information is transmitted from the connection destination and sending the result of the collation to the connection destination.

12. A reconnection apparatus according to claim 10, wherein the means for carrying out reconnection is constituted to carry out reconnection with the connection destination by an unused circuit which has been searched based on the connection destination information and the connection information of the storing means.

13. A reconnection apparatus in a direct communication system between subsidiary radiotelephone units in which connection between the subsidiary radiotelephone units is forcedly disconnected when direct communication is carried out between the subsidiary radiotelephone units over a prescribed duration of a continuous connection, the apparatus comprising:

detection means for detecting the passage of the prescribed duration of a continuous connection and informing the expiration of the prescribed duration of a continuous connection immediately before the prescribed duration of a continuous connection expires;

means for informing the outside of the passage of the prescribed duration of a continuous connection in response to the information from the detection means;

judging means for judging whether there is a communication continuation instruction from the outside in response to the information from the detection means;

first storing means for storing at least information on the connection destination of the direct communication and information on connection between the subsidiary radiotelephone units when the judging means judges that there is the communication continuation instruction;

means for instructing the connection destination of the direct communication to store the connection information when the judging means judges that there is the communication continuation instruction;

second storing means for storing the connection information when it is instructed to store the connection information by the connection destination;

means for carrying out reconnection with the connection destination based on the connection destination information and the connection information stored in the first storing means when the judging means judges that there is the communication continuation instruction;

means for sending the connection information stored in the first storing means to the connection destination after the execution of the reconnection;

means for collating connection information with connection information stored in the second storing means when the former connection information is transmitted from the connection destination and sending the result of the collation to the connection destination;

means for informing the outside that reconnection of direct communication with the connection destination is being carried out until the result of the collation is transmitted from the connection destination; and means for informing the outside of resumption of direct communication with the connection destination when a message that the result of the collation is normal is transmitted from the connection destination.

14. A reconnection apparatus according to claim 13, wherein the means for carrying out reconnection is constituted to carry out reconnection with the connection destination by an unused circuit which has been searched based on the connection destination information and the connection information of the storing means.

* * * * *